Oct. 28, 1958 F. A. STRAUB 2,857,656
METHOD OF MAKING HIGH LOAD CAPACITY BEARINGS
Filed April 26, 1954
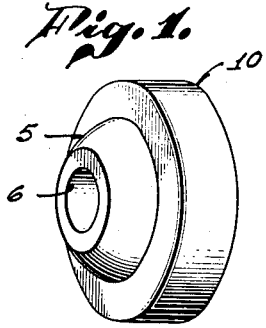
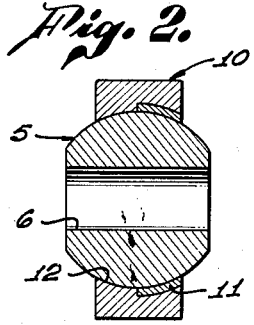
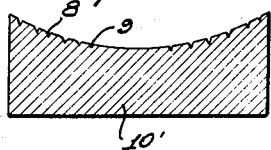
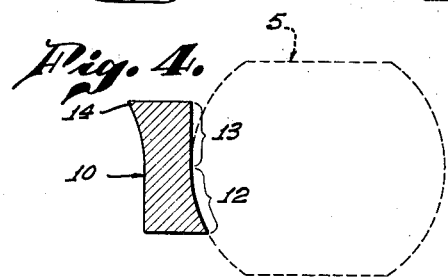
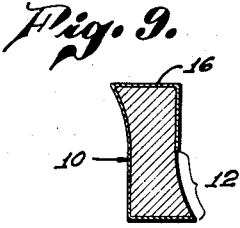
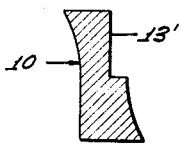
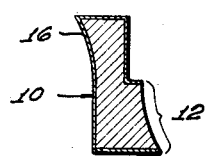
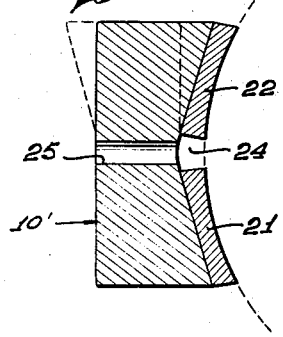
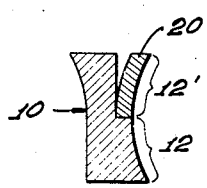
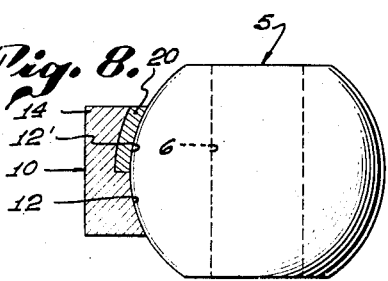
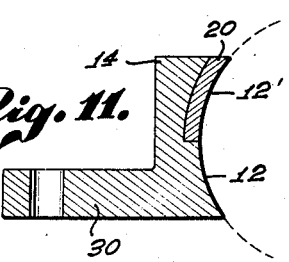
INVENTOR.
FREDERICK A. STRAUB,
BY
ATTORNEY.

United States Patent Office 2,857,656
Patented Oct. 28, 1958

2,857,656

METHOD OF MAKING HIGH LOAD CAPACITY BEARINGS

Frederick A. Straub, Los Angeles, Calif., assignor to Aetna Steel Products Corporation, New York, N. Y., a corporation of New York Application April 26, 1954, Serial No. 425,537

3 Claims. (Cl. 29—149.5)

This invention relates to methods of manufacturing an improved self-aligning bearing of high-load capacity. Bearings structures coming within the scope of this invention may assume various forms and may be flanged, formed in end portions of rods and the like, placed in or attached to a great variety of supports, and employed wherever control rods, actuating shafts and the like must be mounted. These bearings must transfer movement accurately and at the same time possess a certain amount of flexibility. Such bearings are particularly useful in aircraft since the entire aircraft must possess structural flexibility and at the same time all control elements must respond accurately with precision and without play.

Generally, bearings of the character here disclosed have been made in the past by swedging a race or retainer ring around an inner ball element so that in effect a ball and socket type of joint is produced. Bearings of this general type are shown in a number of prior patents such as, for example, #1,793,874; #1,684,984; #1,693,748; #2,366,668, and #2,382,773. It will be noted that in all of these prior bearings, even though a hardened internal ball was employed, the outer ring or race was of soft metal such as Babbitt or mild steel. As a result, these prior bearings could not resist high loads.

The present invention distinguishes from prior structures in that the race, which embraces and is irremovably but rotatably carried by the inner ball element, is provided with a prefinished, ground or honed internal bearing surface whereby a much more effective bearing is obtained which will not freeze, score or seize under rotation. Prior methods of manufacturing bearings of this type required that metal of the race be actually swedged or deformed into contact with the surface of the ball; such deformation generally produced an irregular, wrinkled surface, not all portions of the surface of such race being in contact with the surface of the ball. These wrinkles or irregular areas prevented the load from being distributed uniformly over the entire face of the race and were instrumental in causing breakdown, scoring and freezing. As described hereafter, the invention also permits the production of a bearing wherein the annular, irremovable race has an internal, preformed surface which is harder than surfaces obtained by swedging metal onto the ball, the hardness being equal to or exceeding the hardness of the ball surface.

It is an object of the present invention, therefore, to disclose a method of manufacturing a self-aligning, high-load capacity ball and socket type of bearing, such bearing being free from metal deformed into contact with the surface of the ball.

A still further object of the invention is to disclose and provide simple and efficient methods of manufacturing improved, high-load capacity bearings.

These and other objects of the invention will become apparent to those skilled in the art from the following detailed description, explanation and understanding being facilitated by the appended drawings wherein:

Fig. 1 is a perspective view of a bearing made in accordance with the present invention.

Fig. 2 is a transverse section taken through the bearing illustrated in Fig. 1.

Fig. 3 is an enlarged transverse section through a race made by swedging the race around the ball.

Figs. 4, 5, 6, 7, and 8 illustrate a sequence of exemplary steps which may be employed in one method of making a bearing of this invention.

Fig. 9 illustrates a modified step which may be used in an alternate method of making a bearing.

Fig. 10 is an enlarged transverse section through a race made in accordance with the present invention.

Fig. 11 illustrates a modified form of bearing made in accordance with the present invention.

A typical bearing of the character embraced by this invention is illustrated in Fig. 1 and as there shown comprises the external annular race 10 which embraces and is irremovably carried by an inner ball element 5. Ordinarily the inner ball element 5 is freely rotatable within the race 10. The ball 5 is provided with a hardened external spherical surface and ordinarily the ball is provided with an axial bore such as the bore 6.

As previously stated, the external race 10 has heretofore been completely swedged around the ball and as indicated in Fig. 3, the deformation of the metal which forms the race 10' into contact with the surface of the ball causes the internal surface of the race to wrinkle producing crevices such as those indicated at 8 and 9. In other words, the internal spherical surface of the race has heretofore been formed by actually deforming a metal into contact with the contained ball and the internal concave surface of the race was not ground or finished so as to produce a smooth bearing surface.

Fig. 2 illustrates an axial section through a self-aligning bearing made in accordance with the present invention and it will be noted that the race 10 is provided with an insert 11. The inner surface of the race 10 (being partly made of a surface 12 and the surface of the insert 11) is substantially as hard as the ball 5. Neither that portion of the annular race 10 which includes the spherical surface 12 nor the spherical surface provided on the insert 11 have been deformed into contact with the surface of the ball 5. As a result, the surfaces in contact with the ball 5 are free from the dimples, wrinkles or crevices such as 8 and 9 illustrated in Fig. 3.

The desirable results of the present invention may be attained in various ways. Figs. 4 to 8 inclusive illustrate one method of manufacture, these figures showing successive steps which may be employed in producing a bearing answering the requirements herein stated. The first step, illustrated in Fig. 4, may be the formation of an annular race 10, it being noted that a portion of the internal surface of such race indicated at 12 is actually in the form of a spherical zone having substantially the same radius as that of a ball 5 which is to be used therein. The race collar 10 preferably has a width of about one half the diameter of the ball 5 to be used therein. It may also be noted that in addition to the surface 12, the race collar 10 is provided with a virtually cylindrical surface 13 having a radius not smaller than the radius of the ball or of the spherical zone 12. The body of the ring or collar 10 is thicker at that edge or end provided with the cylindrical surface 13, such excess material or thickness being indicated at 14. The external surface of the race collar is, therefore, substantially cylindrical opposite the internal spherical surface 12 and somewhat conical or gradually increasing in external diameter opposite the internal cylindrical surface 13, as illustrated in Fig. 4. These race collars can be made of any suitable alloy steel capable of being swedged. The race collar is then machined as indicated in Fig. 5 so as to increase the internal diameter of the cylindrical portion to form an internal substantially cylindrical surface as indicated at 13' in Fig. 5. Thereafter, the partially formed annular race collar is subjected to treatment whereby the spherical surface indicated at 12 is hardened. This may be accomplished in a number of different ways and carburizing (either liquid, gas or solid pack), selective carburizing, cyaniding, nitriding, or induction heat treatment may be employed, depending somewhat upon the composition of the metal from which the annular race collar 10 is made. As illustrated in Fig. 6, all surfaces of the annular race collar with the exception of the concave, spherical, internal surface area 12 may be protected by a layer of copper or other suitable composition 16 and then subjected to carburization which hardens the spherical surface 12 without hardening the rest of the annular race collar. After carburizing, the copper or other protective coating is removed.

A relatively thin annular liner member is separately formed, such annular liner member being of lesser width than the race collar, generally approximately one half the width of the race collar. Such thin annular liner member indicated at 20 is generally made of hard metal, or is hardened and is provided with an internal surface 12' in the form of a spherical zone having the same radius as spherical surface 12. This annular liner member may be inserted into the collar 10, as indicated in Fig. 7 and the two surfaces 12 and 12' simultaneously ground to the same spherical contour.

After the above steps have been completed, the liner 20 is removed from the position in which it is shown in Fig. 7, the ball 5 is seated upon the hard finished surface 12 of the race collar 10, the liner 20 is inserted into contact with the surface of the ball 5 and this assembly is then subjected to swedging whereby the upper end of the race collar and particularly the thickened portion 14 is swedged against the liner 20 so as to firmly hold it in position within the race collar and in sliding contact with the surface of the ball 5.

It is to be remembered that the ball 5 is generally made of high-grade alloy steel or stainless steel and its external spherical surface is ground to a polished, micro-finished surface, the hardness of such surface being generally on the order of Rockwell C 60. The carburizing step mentioned herein to which the internal surface of the race collar 10 was subjected also results in the production of a hardness of about Rockwell C 60 in the surface 12. The liner member 20 is also made of a hard steel having substantially the same hardness as the surface of the ball 5. As a result, it will be noted that the surfaces 12 and 12', which are in contact with the ball 5 in the finished article, have substantially the same hardness as the ball and no part of the metal of the annular race collar has been deformed into contact with the surface of the ball. As a result, the bearing is capable of withstanding high loads without destruction. It may be noted in passing that after the swedging operation referred to in connection with Fig. 8 (whereby the liner 20 was firmly retained within the annular race), the outer race collar may be peened, rolled or slightly stretched by other manipulation in order to produce the desired tolerance or freedom to movement between the ball 5 and the internal surfaces of the race collar.

Instead of machining the race collar before hardening or carburization, an annular race collar made of malleable metal but provided with an internal surface in the form of a spherical zone such as the surface 12, may be selectively carburized as illustrated in Fig. 9 (by the application of copper or other protective material 16 thereto) and then machined to desired contours.

Bearings can also be made wherein the entire internal surface of the race collar is provided with inserts. An enlarged transverse view of such type of race collar is shown in Fig. 10. It will be there noted that the collar 10' is provided with a lower insert or thin annular liner member 21 and with an upper liner member 22. These two liner members 21 and 22 are of material which has been hardened to the hardness of the ball with which they are to cooperate. Liner members such as 21 and 22 may be placed in a suitable jig so as to permit both of their internal surfaces to be ground to the desired spherical contour. The annular race 10' is provided with a lower internal face capable of receiving the lower liner member 21, the ball then seated thereupon, the second or upper liner member 22, then dropped into position within the collar while it has the contour indicated in dash lines and the upper part of such collar then swedged into position (shown in full lines) to positively hold the liner member 22 in place. Space between the liner members 21 and 22 may constitute an oil groove 24 and suitable radial bores such as 25 may be provided for furnishing lubrication to the groove 24.

The annular race collars may be provided integrally with a shank or they may be provided with a flange 30 as indicated in Fig. 11. It is also contemplated that the ball embraced by and retained within the annular race collar, can rotate, be angularly moved within the collar, may be provided with a neck or opposing necks extending in the direction of the bore and having surfaces merging with the spherical surface portion thereof, and the bore in such ball member may be cylindrical, provided with spline ribs or otherwise machined. It will be noted that the hardened surfaces of the annular collar may be, in part at least, integral with the collar (as is surface 12 in Fig. 8) while the body of the race or collar is malleable or unhardened so as to permit swedging, or the internal surfaces of the collar are hardened, well-finished inserts or liners permanently retained within the race collar, as in Fig. 10. The rear surfaces of the inserts, such as the liner inserts 20 or 22 may be curved to a spherical zone, may be conical zones, or may be provided with a lip, shoulder or bead to facilitate retention in the annular race collar. Moreover, although specific reference has been made to a stated hardness of ball and race, any desired hardness and finish can be employed and adapted to produce a bearing answering the industrial requirements.

Although by the use of hardened inserts a bearing capable of withstanding high loads under repeated rotation is obtained, some industrial uses do not require high-load bearings and do not justify the use of steel for the race collar. For such lower load purposes, and where the bearing cannot receive lubrication, the race collar and insert or inserts can be made of brass or other desirable bearing metal, and the inner surfaces of the race collar provided with a prefinished, ground surface which conforms to and perfectly matches the surface of the ball, permitting long continued use without scoring, freezing or seizing since no metal is deformed or swedged into contact with the ball.

Those skilled in the art will readily appreciate that numerous variations and changes in procedure may be made without departing from the scope of the invention here disclosed. Those skilled in the art will also readily appreciate the value and improved characteristics of the self-aligning bearings made in accordance with the present invention.

I claim:

1. A method of making a ball and socket type of universal bearing employing a bored ball rotatably mounted in a race collar, said ball having a hardened and polished spherical surface, comprising: forming a metallic annular race collar of unhardened material and having a width of about one half the diameter of a ball to be used therein, said race collar having an internal surface, one portion of said surface constituting a spherical zone and another portion being virtually cylindrical with an axis coincident to the axis of the bored ball in normal position and of a radius greater than the radius of said spherical zone; hardening the surface in said spherical zone without appreciably hardening the metal adjacent the cylindrical surface; forming a relatively thin annular liner member of lesser width than said race collar, the liner member being hardened and having an internal surface in the form of a spherical zone of the same radius as that of the spherical zone in the race collar; seating a ball having a hardened surface in said race collar; inserting the preformed and hardened liner member into the cylindrical portion of said race collar and into contact with a spherical zone of said ball; and swedging in a radial direction the unhardened portion of the race collar onto and about said liner.

2. A method of making a ball and socket type of universal bearing employing a bored ball rotatably mounted in a race collar, said ball having a hardened and polished spherical surface, comprising: forming a metallic annular race collar of unhardened material and having a width of about one half the diameter of a ball to be used therein, said race collar having a radius not smaller than the radius of such ball; forming a pair of relatively thin annular liner members of lesser width than said race collar, the liner members being hardened and each provided with a finished internal spherical surface adapted to slidably contact a spherical zone surface of a single ball; placing one of the preformed liners in the race collar, seating a ball upon said liner, inserting the other preformed liner into the collar and into contact with said ball and then swedging in a radial direction a portion of the race collar onto and about said second liner to irremovably hold said preformed liners in sliding contact with the surface of a ball.

3. A method of making a ball and socket type of universal bearing employing a bored ball rotatably mounted in a race collar having an axis therethrough, said ball having a hardened and polished spherical surface, comprising: forming a metallic, annular race collar of unhardened material and having a width of about one half the diameter of a ball to be used therein, said race collar having an internal surface, one portion of said surface constituting a spherical zone and another portion being virtually cylindrical about said axis and of a radius greater than the radius of said spherical zone; forming a relatively thin annular liner member of lesser width than said race collar, the liner member having an internal surface in the form of a spherical zone of the same radius as that of the spherical zone in the race collar; grinding the spherical zones of the race collar and liner to match the surface contour of the ball; seating a ball having a hardened surface in the spherical zone of said one surface portion; inserting the preformed liner member into the cylindrical portion of said race collar and into contact with said ball; and swedging in a radial direction towards said axis a portion of the race collar onto and about said liner.

References Cited in the file of this patent

UNITED STATES PATENTS

| | | |
|---|---|---|
| 1,301,323 | Schatz | Apr. 22, 1919 |
| 1,693,748 | Fiegel | Dec. 4, 1928 |
| 1,911,336 | Ackerman | May 30, 1937 |
| 2,259,324 | Robinson | Oct. 14, 1941 |
| 2,365,552 | Hill | Dec. 19, 1944 |
| 2,488,775 | Heim | Nov. 22, 1949 |
| 2,541,160 | Heim | Feb. 13, 1951 |
| 2,614,898 | Adams | Oct. 21, 1952 |
| 2,615,119 | Riegel | Oct. 21, 1952 |
| 2,681,259 | White | June 15, 1954 |
| 2,711,352 | Hasko et al. | June 21, 1955 |

FOREIGN PATENTS

| | | |
|---|---|---|
| 432,370 | Great Britain | July 25, 1935 |